United States Patent Office 3,022,338
Patented Feb. 20, 1962

3,022,338
PROCESS FOR THE PRODUCTION OF UNSATURATED MONOCARBOXYLIC ACID ESTERS
Eduard Enk and Fritz Knörr, Burghausen, Upper Bavaria, Germany, assignors to Wacker-Chemie G.m.b.H., Munich, Germany
No Drawing. Filed June 23, 1959, Ser. No. 822,218
Claims priority, application Germany June 25, 1958
8 Claims. (Cl. 260—486)

The present invention relates to an improved process for the production of unsaturated monocarboxylic acid esters from alpha- or beta-alkoxy or aryloxy substituted monocarboxylic acid esters employing mixed silica containing catalysts.

It is known that acrylic esters can be prepared by treating beta-alkoxy propionic acid esters in the liquid or gaseous phase with dehydrating agents, such as sulfuric acid (German Patent No. 573,724). Volatile acidic organic sulfur compounds which reduce the stability of the acrylic acid esters produced were produced as by-products in such reaction in view of reduction reactions. Furthermore, the yields obtainable were variable in view of losses engendered by polymerization. In the case of acrylic acid methyl ester the yields attained were between 68.5 and 80%.

The production of alpha-beta unsaturated esters by splitting off alcohol from beta-alkoxy substituted propionic or isobutyric acid esters in the liquid phase in the presence of sodium alcoholate has been described in U.S. Patent No. 2,393,737. It has also been proposed to improve the yields and increase the velocity of the reaction by dissolving the sodium methylate employed as the catalyst in methanol and to permit to drop the beta-methoxy isobutyric acid methyl ester into the heated solution at the same rate as the methacrylic acid methyl ester which is formed distills off. It was possible in this way to achieve yields of up to 92.5% based upon the beta-methoxy isobutyric acid methyl ester converted. However, the separation of a large excess of methanol from the methacrylic acid methyl ester by extractive or azeotropic distillation is rather costly.

In order to increase the velocity of the conversion, the alkaline cleavage of beta-alkoxy substituted esters with the formation of alpha-beta unsaturated esters was carried out in the gas phase according to U.S. Patent No. 2,457,225 employing basic alkali metal and alkaline earth metal compounds as catalysts. The cleavage products obtained are essentially free of acid but in view of the high temperatures required for the dealcoholysis considerable decomposition of the ester formed occurred which is evidenced by the strong yellow brown coloration of the cleavage product and the deposit of carbon on the catalyst which reduced its activity.

According to the invention it was found that unsaturated monocarboxylic acid esters can be produced by dealcoholizing alpha- or beta-alkoxy or aryloxy substituted monocarboxylic acid esters employing mixed catalysts which in addition to alkaline earth metal phosphates, particularly the primary phosphates of calcium and magnesium, also contain compounds of the transition elements of groups I to VIII of the periodic system (according Holleman-Wiberg, Lehrbuch der Anorganischen Chemie, 26 and 27 edition, 1951, Verlag Walter de Gruyter u. Co., Berlin, pages 424 et. seq.). It furthermore was found advantageous if such mixed catalysts are supported on carriers having a large surface area. Silica gel is particularly suited as such a carrier but other carriers, such as active carbon, pumice, silicates, such as kaolin, silica earths and the like can also be employed.

It is advantageous when the alkaline earth metal phosphate constitutes the major portion, preferably at least 70% by weight, of the mixed catalyst. The compounds of the transition elements of groups I to VIII of the periodic system which are to be used in conjunction with the phosphates can be oxides or salts of preferably the following elements: copper, silver, gold, cerium, zirconium, hafnium, thorium, vanadium, niobium, tantalum, chromium, molydenum, tungsten, uranium, iron, cobalt, nickel and the platinum metals. Salts of these metals can be employed in which such metals are cations, such as, for example, in halides, nitrates, nitrites, sulfides, sulfates, sulfites, phosphates, phosphites or borates. However, such metal salts can be employed which contain the transition elements as complexly bound anions as, for example, in chromates, vanadates, tungstates, molybdenates and uranates. It is also possible to add mixtures of the above mentioned compounds of transition elements to the alkaline earth metal phosphates. In addition, it is possible to add the transition elements themselves if they react with acid reacting phosphates or with added phosphoric acid or other acids to produce metal salts. Mixed catalysts of alkaline earth metal phosphates with mixtures of the indicated types of compounds of the transition elements can also be used. In some instances it can be advantageous if small quantities of aluminum or boron compounds, especially the phosphates, are added to these mixtures.

The catalysts according to the invention are advantageously employed at temperatures between 250° and 380° C., preferably between 300° and 350° C. The conversion according to the invention can be carried out in the gas or liquid phase and can be carried out continuously or discontinuously. When it is carried out in the gas phase, the vaporized material is passed through a heated tube filled with the catalyst at atmospheric or subatmospheric pressure, preferably admixed with an inert gas, such as nitrogen. The heating of the catalyst tube can be effected by electric heating or with a heated gas which is passed over the tube with a blower to prevent local overheating.

The vapors after the cleavage and condensation are collected in a trap cooled to about 0° C. and the unsaturated monocarboxylic acid esters are separated from the non-converted starting material and by-products by simple or azeotropic distillation. The components reaction mixture, however, also can be recovered by extractive distillation in a known manner, if desired, with the addition of polymerization inhibitors, such as nitrogen oxides.

When the reaction is carried out in the liquid phase care must be taken to achieve intimate contact between the catalyst and the liquid starting material. This can be achieved by mechanical measures, such as stirring, shaking, spraying or vibration, or by chemical measures which favor the formation of large surface areas. Care must be taken that the reaction product is withdrawn from the reaction chamber as rapidly as possible. The use of superatmospheric pressures promotes the reaction.

The degree of cleavage the ether esters attained in the process according to the invention depends upon the reaction temperature, as well as the quantity of catalyst provided. The quantity of starting material charged to the catalyst per unit of time can be varied within wide limits and can be adapted to the conditions at hand.

Preferably, the alcohols from which the alkoxy and ester groups of the starting alkoxy monocarboxylic acid esters are derived are alkanols containing 1 to 8 carbon atoms.

The following examples will serve to illustrate a number of embodiments of the process according to the invention.

Example 1

Beta-methoxy propionic acid methyl ester was passed in vapor form at 350° C. over a catalyst consisting of 30% of primary calcium phosphate and 1.5% of ammonium chromate on silica gel. The rate at which such ether-ester was passed over the catalyst was 0.5 g. per cc. of catalyst per hour. The conversion was 72.2% with reference to the ether-ester supplied to the catalyst. The yield of acrylic acid methyl ester was 89.4% with reference to the ether-ester converted.

Example 2

Beta-methoxy propionic acid methyl ester was passed in vapor form at 350° C. over a catalyst which contained 30% of primary magnesium phosphate and 1% of iron on silica gel. The iron was applied to the catalyst as iron (III) chloride. The rate at which such ether-ester was passed over the catalyst was 0.6 g. per cc. of catalyst per hour. The conversion was 86.6% with reference to the ether-ester supplied to the catalyst. The yield of acrylic acid methyl ester was 91.5% with reference to the ether-ester converted.

Example 3

Beta-methoxy isobutyric acid methyl ester was passed in vapor form at 330° C. over a catalyst consisting of 30% of primary magnesium phosphate, 2% of copper oxide and 1% of nickel oxide supported on silica gel. The rate at which such ether-ester was passed over the catalyst was 0.8 g. per cc. of catalyst per hour. The conversion was 87.6% with reference to the ether-ester supplied to the catalyst. The yield of methyl methacrylate was 90.3% with reference to the ether-ester converted.

Example 4

Beta-methoxy isobutyric acid methyl ester was passed as in Example 3 over a catalyst consisting of 30% of primary magnesium phosphate, 1.5% of ammonium vanadate and 0.15% of cerium sulfate supported on silica gel. The conversion was 82.5% with reference to the ether-ester supplied to the catalyst. The yield of methyl methacrylate was 92.4% with reference to the ether-ester converted.

Example 5

500 cc. of silica gel of a grain size of 4-6 mm. was impregnated with an aqueous solution containing 48 g. of phosphoric acid (calculated as 100%), 41 g. magnesium chloride hexahydrate, 2.0 g. of boric acid and 1.6 g. of thorium nitrate tetrahydrate. The catalyst was dried at 100° C. and then heated for 48 hours at 700° C.

Beta-methoxy propionic acid methyl ester was passed in vapor form at 350° C. over this catalyst at a velocity of 0.37 g. per cc. of catalyst per hour. The conversion was 87.0% with reference to the ether-ester supplied to the catalyst and the yield of acrylic acid methyl ester was 94.2% with reference to the ether-ester converted.

Example 6

500 cc. of silica gel of a grain size of 4-6 mm. was impregnated with an aqueous solution containing 40 g. of phosphoric acid (calculated as 100%), 28.4 g. of magnesium chloride hexahydrate, 2.7 g. aluminum chloride hexahydrate and 1.1 g. of thorium nitrate tetrahydrate. The catalyst was dried at 100° C. and then heated for 48 hours at 700° C.

Beta-methoxy propionic acid methyl ester was passed over this catalyst as in Example 5. The conversion was 81.1% with reference to the ether-ester supplied to the catalyst and the yield of acrylic acid methyl ester was 92.7% with reference to the ether-ester converted.

We claim:

1. A process for the production of $\alpha,\beta$-unsaturated monocarboxylic acid esters which comprises contacting a $\beta$-alkoxy monocarboxylic acid ester with a catalyst comprising an alkaline earth metal phosphate and a compound of a transition element of group I to group VIII of the periodic system selected from the group consisting of copper, cerium, thorium, vanadium, chromium, iron and nickel at a temperature between 250 and 380° C. to form an $\alpha,\beta$-unsaturated carboxylic acid ester and an alcohol.

2. The process of claim 1 in which the quantity of alkaline earth metal phosphate in said mixed catalyst constitutes at least 70% by weight of the catalyst.

3. The process of claim 1 in which said catalyst additionally contains a relatively small quantity of an aluminum phosphate.

4. The process of claim 1 in which said catalyst additionally contains a relatively small quantity of a boron phosphate.

5. The process of claim 1 in which said mixed catalyst is supported on a carrier.

6. The process of claim 1 in which said mixed catalyst is supported on silica gel.

7. The process of claim 1 in which said $\beta$-alkoxy monocarboxylic acid ester is contacted with the catalyst at temperatures between 300 and 350° C.

8. The process of claim 1 in which said $\beta$-alkoxy monocarboxylic acid ester is a $\beta$-alkoxy monocarboxylic acid alkyl ester.

References Cited in the file of this patent

UNITED STATES PATENTS

| | | |
|---|---|---|
| 2,376,704 | Kung | May 22, 1945 |
| 2,457,225 | Gresham | Dec. 28, 1948 |

OTHER REFERENCES

Burwell: Chem. Rev. 54, 615–685 (1954) (pp. 622, 628–629, 638, 660 and 672–673 especially relied on).

Fuson: "Advanced Organic Chemistry," 1950, pages 95–97.

Pauling: "College Chemistry," 1955, page 82.

Berkman et al.: "Catalysis," 1940, pp. 735–746.